April 30, 1963 W. F. NEWBOLD ET AL 3,088,073
SPURIOUS SIGNAL ELIMINATOR UTILIZING A THREE WINDING
TRANSFORMER HAVING TWO SECONDARIES BIFILARLY WOUND
Filed April 27, 1960
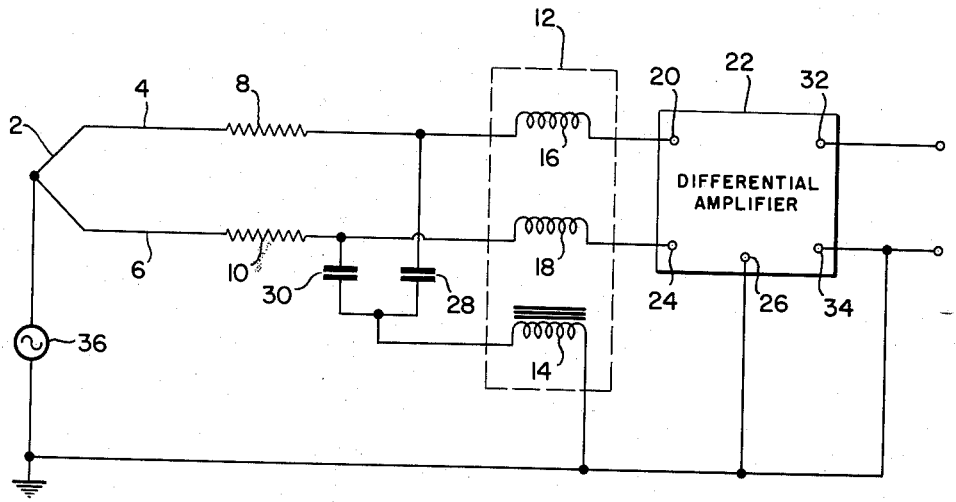
INVENTORS.
WILLIAM F. NEWBOLD
BY HARRY L. LATHAM JR.
ATTORNEY.

United States Patent Office 3,088,073
Patented Apr. 30, 1963

1

3,088,073
SPURIOUS SIGNAL ELIMINATOR UTILIZING A THREE WINDING TRANSFORMER HAVING TWO SECONDARIES BIFILARLY WOUND
William F. Newbold, Springfield Township, Montgomery County, and Harry L. Latham, Jr., Philadelphia, Pa., assignors to Minneapolis-Honeywell Regulator Company, Minneapolis, Minn., a corporation of Delaware
Filed Apr. 27, 1960, Ser. No. 25,117
9 Claims. (Cl. 328—3)

This invention relates to electrical apparatus, and more particularly to electrical measuring apparatus.

In using such measuring instrumentalities or primary sensing elements as thermocouples in certain industrial operations, it has been found that a spurious signal is introduced into the measuring circuit as a result of an unavoidable but undesirable grounding of the sensing junction. The same effect has been found in certain applications of strain gages. This spurious signal usually appear as an alternating current signal in both legs of a measuring circuit, raising the two legs of the circuit above ground by the amount of the spurious signal. For this reason it is referred to as a common mode signal. Since the output of the amplifiers most often associated in this type of measuring circuit is referred to ground, the spurious or common mode signal introduces an error in the output. One approach to obviating the error due to this signal has been to have the entire amplifier floating, that is, not connected to ground. This arrangement may, to a certain extent, eliminate the error in output signal but it introduces the hazardous condition of having the amplifier operating at a level several hundred volts above ground. This, obviously, is an undesirable condition from the point of view of the personnel involved.

Various efforts have meen made to provide means for filtering out the spurious alternating current signal. However, in many instances they have not proven to be entirely satisfactory.

It is, accordingly, an object of the present invention to provide improved means for eliminating the effect of common mode signals in direct current measuring circuits.

It is another object of this invention to provide improved means for eliminating the effect of spurious common mode signals in direct current measuring circuits wherein the amplifier is not held at a high potential with respect to ground.

It is a further object of this invention to provide means as set forth wherein the A.C. common mode signal is substantially eliminated ahead of the associated amplifier.

In accomplishing these and other objects there has been provided a transformer having three windings, a primary and two secondaries. The two secondaries are bifilarly wound and arranged for series connection in the two legs, respectively, of a measuring circuit and between the measuring instrumentality and an associated amplifier. The primary winding is capacitively coupled between ground and the two legs of the measuring circuit. The primary of the transformer carries most of the current due to the spurious signal and applies it to oppose the current in the two secondary windings, thus substantially eliminating the effect of the spurious signal before it can get to the amplifier.

A better understanding of this invention may be had from the following detailed description when read in connection with the accompanying drawing wherein the single FIGURE is a schematic representation of a measuring circuit embodying the present invention.

Referring now to the drawing in more detail, there is shown a measuring instrumentality here represented as a thermocouple 2 having a first leg 4 and a second leg 6. A resistance 8 is representative of the series line resistance

2 of the first leg 4 while a resistance 10 is representative of the series line resistance of the second leg 6. There is provided a transformer 12 which has a primary winding 14 and two secondary windings 16 and 18, respectively. The two secondary windings are bifilarly wound as will be set forth more fully hereinafter. One secondary winding 16 is serially connected in the first leg 4 between the resistance 8 and one input terminal 20 of a differential amplifier 22. The other secondary winding 18 is serially connected in the second leg 6 between the resistance 10 and a second input terminal 24 on the differential amplifier 22. The differential amplifier referred to herein may be of the type made by Minneapolis-Honeywell Regulator Company and sold commercially under the trade name of Accudata II. That amplifier is described and claimed in a copending application of Richard S. Burwen, Serial No. 774,368, filed November 17, 1958, entitled "Electronic Apparatus."

The terminals 20 and 24 constitute the differential input terminals of the amplifier. A third terminal 26 carries the common mode reference level. The amplifier is also provided with a pair of output terminals 23 and 34, the latter of which is connected to the common mode terminal 26.

To the junction between the resistance 8 and the transformer winding 16 is connected one side of a coupling capacitor 28. A similar capacitor 30 is connected to the junction between the resistance 10 and the secondary winding 18. The other side of these two capacitors are connected together and the junction thereof connected serially through the primary winding 14 of the transformer 12 to the common mode terminal 26 of the amplifier 22.

In certain uses of measuring instrumentalities such as the thermocouple shown, there is a spurious signal imposed thereon which appears as though an alternating current generator were connected between the junction of the thermocouple and some reference level. Under these conditions, a spurious alternating signal is introduced across the two legs of the measuring circuit in parallel and superimposed upon the unidirectional signal generated by the thermocouple. This spurious signal is schematically represented in the drawing by an A.C. generator 36 connected between the junction of the thermocouple 2 and the common mode reference level shown connected to the terminal 26 of the amplifier 22.

In experience, it has been found that the spurious signal may be many times larger than the desired intelligence signal. For example, while the intelligence signal from the thermocouple is in the millivolt range, the common mode signal may well be on the order of a hundred volts or more. Even though the differential amplifier exhibits a high degree of common mode rejection, spurious signals of this magnitude may, because the amplifier is a high gain amplifier, often cause large A.C. signal to appear at the output terminals 32 and 34 of the amplifier. It may even cause an overload condition in the amplifier. The two secondary windings were described as being bifilarly wound. This provides for the two windings to be as nearly identical as is reasonably possible, both as to their individual characteristics and as to their inductive relation to the primary winding 14. Since the desired signal from the thermocouple is a direct current signal, to avoid shunting that signal away from the amplifier, the primary winding 14 is capacitively coupled to the measuring circuit. A signal substantially equal to the spurious A.C. signal is developed across the primary winding due to the current fed thereto by the coupling capacitors 28 and 30. The inductive coupling between the primary 14 and the two secondaries 16 and 18 causes a voltage to be applied across these two secondaries which is in opposition to the spurious signal, reducing the A.C.

voltage drop across these two winding to substantially zero. Any residual A.C. signal remaining as a common mode signal may be adequately handled by the common mode rejection of the amplifier. In practice, it has been found that the voltage drop across the primary 14 is not exactly equal to the voltage of the spurious signal but is slightly less, due to the inherent resistance of the primary winding. Accordingly, the primary winding has slightly fewer turns than either of the two secondaries. Thus there is provided a small voltage gain in the transformer which tends to overcome this resistance loss.

If the line impedance of the two legs of the measuring circuit were equal, the common mode signal would divide equally between them. However, in measuring circuits of this type, the resistive impedance of the two legs is inherently not equal. This results in a differential component of the common mode signal. Accordingly, the capacitors 28 and 30 are of such value relative to each other that the two legs are balanced with respect to the common mode signal looking back from the primary winding 14 toward the thermocouple 2, thus providing equal voltage drops across resistances 8 and 10 respectively.

With the foregoing arrangement, the spurious signal is either totally eliminated or reduced to a level that can be properly handled by the inherent common mode rejection of the amplifier.

What is claimed is:

1. Electrical measuring apparatus comprising an electrical measuring circuit including a primary sensing element, said measuring circuit having a first leg and a second leg, a differential amplifier having a first and second input terminal and a common-mode reference terminal, a transformer having a primary winding and two secondary windings, one of said secondary windings being serially connected between said first leg of said measuring circuit and said first input terminal of said amplifier, the other of said secondary windings being serially connected between said second leg of said measuring circuit and said second input terminal, said primary winding being connected at one end to said common mode reference terminal, and capacitive coupling means coupling each of said legs of said measuring circuit to the other end of said primary winding, said primary winding being inductively coupled to said secondary windings to produce in said secondary windings a signal in opposition to common mode signals in said measuring circuit.

2. Electrical measuring apparatus comprising an electrical measuring circuit including a primary sensing element, said measuring circuit having a first leg and a second leg, a differential amplifier having a first and a second input terminal and a common mode reference terminal, a transformer having a primary winding and two substantially identical secondary windings, one of said secondary windings being serially connected between said first leg of said measuring circuit and said first input terminal of said amplifier, the other of said secondary windings being serially connected between said second leg of said measuring circuit and said second input terminal, said primary winding being connected at one end to said common mode reference terminal, and direct current isolating means coupling the other end of said primary winding to both legs of said measuring circuit, said primary winding being coupled to said secondary windings to produce in said secondary winding a signal in opposition to common mode signals in said measuring circuit.

3. The invention as set forth in claim 2 wherein said two secondary windings are bifilarly wound.

4. The invention as set forth in claim 3 wherein said primary winding has substantially the same number of turns as each of said secondary windings.

5. The invention as set forth in claim 3 wherein said primary winding has slightly fewer turns than each of said secondaries to produce a voltage gain in said transformer to substantially offset voltage losses in the circuit of said primary winding.

6. The invention as set forth in claim 2 wherein said direct current isolating means coupling said primary winding to both legs of said measuring circuit comprises a first capacitor connected between said first leg of said measuring circuit and said other end of said primary winding, and a second capacitor connected between said second leg of said measuring circuit and said other end of said primary winding.

7. The invention as set forth in claim 6 wherein the capacitive reactance of said capacitors relative to each other is inversely as the resistive impedance of the two legs of the measuring circuit whereby to balance the common mode voltage drop in the two legs.

8. In a signal measuring apparatus, a signal amplifier having input means comprising a pair of differential signal input terminal and a common mode reference terminal, a signal input circuit having a first leg and a second leg, a transformer having a primary winding and two secondary windings, one of said secondary winding being connected serially in said first leg of said input circuit to one of said differential input terminals, the other of said secondary windings being connected serially in said second leg of said input circuit to the other of said differential input terminals, said primary winding being coupled between both of said legs input circuit and a common mode signal reference line connected to said common mode reference terminal, said primary winding being inductively coupled to said secondary windings to produce in said secondary windings a signal opposing common mode signals in said two legs of said input circuit.

9. In a signal measuring apparatus, a signal amplifier having input means comprising a pair of differential signal input terminals and a common mode reference terminal, a signal input circuit having a first leg and a second leg, a transformer having a primary winding and a pair of secondary windings, one of said secondary windings being connected serially in said first leg of said input circuit to one of said differential signal input terminals, the other of said secondary windings being connected serially in said second leg of said input circuit to the other of said differential input terminals, and direct-current isolating means coupling both of said legs of said input circuit to one end of said primary winding, the other end of said primary winding being connected to a common mode reference line connected to said common mode reference terminal, said primary winding being inductively coupled to said secondary windings to produce in said secondary winding a signal opposing common mode signals in said two legs of said input circuit.

References Cited in the file of this patent
UNITED STATES PATENTS
1,773,772    Berthold _____ Aug. 26, 1930

OTHER REFERENCES

Instruments, November 1953, pages 1725–1730, by Charles E. Shepard and I. Warshowsky.